United States Patent Office 2,774,767
Patented Dec. 18, 1956

2,774,767

PROCESS OF PREPARING 2-PHENYL-2-PYRIDYL-(4')-4-DILOWERALKYL AMINO BUTYRIC LOWER ALKYL ESTERS

Gustav Ehrhart, Bad Soden am Taunus, Karl Schmitt, Frankfurt am Main, and Heinrich Ott, Eppstein (Taunus), Germany, assignors to Farbwerke Hoechst Aktiengesellschaft vormals Meister Lucius & Bruning, Frankfurt am Main, Germany, a corporation of Germany No Drawing. Application April 22, 1955,
Serial No. 503,337

Claims priority, application Germany May 3, 1954

4 Claims. (Cl. 260—295)

The present invention relates to a process of preparing basic compounds; more particularly it relates to a process of preparing basic carboxylic esters corresponding to the general formula:

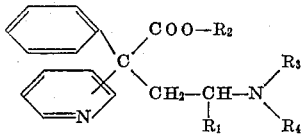

wherein $R_1$ represents hydrogen or methyl, $R_2$ an alkyl radical having at most 4 carbon atoms, and $R_3$ and $R_4$ each represent an alkyl radical having at most 3 carbon atoms or taken together with the nitrogen atom form a saturated heterocyclic ring system. The compounds corresponding to the above given formula constitute valuable intermediates in the synthesis of pharmaceutical compounds. By reaction with organo-magnesium compounds they can, for example, be transformed into the corresponding ketones which are of considerable pharmaceutical interest and, especially, possess an excellent analgesic effect.

Now we have found that basic compounds of the kind described above can be prepared by a simple and smooth reaction by reacting compounds of the general formula:

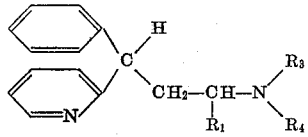

wherein the substituents $R_1$, $R_3$ and $R_4$ have the meanings given above, with alkali metal hydrides, alkali metal amides or alkali metal compounds of hydrocarbons, condensing the alkali metal compounds so obtained with an ester of carbonic or chlorocarbonic acid the alcohol components of which contain at most 3 carbon atoms. As starting materials for the process of this invention there can be used compounds corresponding to the general formula given above, wherein the individual radicals may have the following meanings: $R_1$: hydrogen or methyl, $R_3$ and $R_4$: methyl, ethyl and propyl; the two substituents $R_3$ and $R_4$ taken together with the nitrogen atom may also represent a saturated heterocyclic ring system, for example, a pyrrolidino, piperidino, morpholino or a piperazino grouping.

The following compounds may be especially named:
1 - phenyl - 1 - pyridyl - (2') - 3 - dimethylamino-propane,
1 - phenyl - 1 - pyridyl - (4') - 3 - diethylamino - propane,
1 - phenyl - 1 - pyridyl - (4') - 3 - morpholino - propane,
1-phenyl-1-pyridyl-(2')-3-piperidino-propane and 1-para-chlorophenyl-1-pyridyl-(2')-3-pyrrolidino-propane.

The reaction is conducted with the aid of strongly basic condensing agents. As condensing agents of this kind there may be mentioned, for example: alkali metal compounds of hydrocarbons, such as phenyl sodium, phenyl lithium, butyl lithium, alkali metal amides, for example, sodamide, potassium amide or alkali metal hydrides, such as sodium hydride and lithium hydride. In case alkali metal compounds of hydrocarbons are used as condensing agents, they need not be added in substance. They may also be produced in the reaction mixture in which they intermediarily appear; thus, for example, the sodium compound of the substituted propane is directly formed when a mixture of 1-phenyl-1-pyridyl-3-dimethylamino-propane and chlorobenzene is added dropwise to a suspension of finely dispersed sodium in ether.

As carbonic esters or chlorocarbonic esters there come into consideration, for example, those esters which are derived from alcohols containing at most 3 carbon atoms, for example, carbonic dimethyl ester, carbonic diethyl ester, chlorocarbonic methyl ester, chlorocarbonic propyl ester or chlorocarbonic isopropyl ester.

When performing the reaction, it is advantageous first to transform the corresponding basic compounds in an indifferent solvent, for example, ether or aromatic hydrocarbons, such as benzene, toluene or xylene, into the corresponding alkali metal compounds with the aid of a strongly basic condensing agent.

Carbonic esters or chlorocarbonic esters, which may be added in an undiluted form or in admixture with an indifferent solvent, are then caused to act upon the solutions or suspensions of the alkali metal compounds formed. The reaction may be conducted at a low or at a slightly raised temperature—the heat of reaction being decreased by cooling, if desired—and it may subsequently be completed by heating.

As compared with the known processes which required a multiple stage reaction, the process of this invention is distinguished by a smooth reaction and the simple preparation of basic esters.

The ketones, especially the ethyl ketones, obtainable from the said esters by reaction with organo metallic compounds may, for example, be used as excellent pain or cough stilling pharmaceuticals. Their analgesic effect partly equals and—with regard to their tolerability—excels that of 2-dimethylamino-4.4-diphenyl-heptanone-(5)-hydrochloride.

The following examples serve to illustrate the invention, but they are not intended to limit it thereto, the parts being by weight unless otherwise stated and the relationship of parts by weight to parts by volume being the same as that of the kilogram to the liter:

Example 1

A mixture of 24 parts of 1-phenyl-1-pyridyl-(2')-3-dimethylamino-propane and 12.4 parts of chlorobenzene is added dropwise to a suspension prepared from 5.8 parts of finely dispersed sodium in 100 parts by volume of ether. The reaction becomes evident by a rise of the temperature and a dark coloration of the reaction mixture. After the heat of reaction has decreased, the reaction mixture is heated to boiling for a further two hours. After cooling, 14.75 parts of carbonic diethyl ester are added, while stirring, the temperature being raised thereby to the boiling point of the solvent; finally the reaction mixture is heated to boiling for 30 minutes. After cooling, the brown reaction mixture is mixed with water, while cooling with ice, the organic solution is isolated, washed with water, dried with sodium sulfate and evaporated. The residue so obtained is then fractionated under reduced pressure. 2-phenyl - 2 - pyridyl-(2')-4-dimethylamino butyric ethyl ester is obtained in the form of a viscous liquid boiling at 175–180° C. under a pressure of 2.5 mm. of mercury.

With the aid of, for example, ethyl magnesium bromide, the ester so obtained may be transformed in known manner into the corresponding ketone.

*Example 2*

To a suspension of 46 parts of finely dispersed sodium in 300 parts by volume of ether there is added about one-third of 98 parts of chlorobenzene and the reaction is started by heating or adding 3 drops of methanol. The remaining two-thirds of the chlorobenzene mixed with 192 parts of 1-phenyl-1-pyridyl-(4')-3-dimethylamino-propane are then added dropwise to the reaction mixture so obtained and the whole is stirred until the reaction heat decreases. The dark-brown reaction mixture is then heated to boiling for a further 90 minutes. After cooling, 120 parts of carbonic diethyl ester are added dropwise; the temperature should preferably not exceed 30° C. The reaction mixture is then stirred for 1 hour and finally heated to boiling for 75 minutes. After cooling, the reaction mixture is mixed with water, while cooling with ice, and the organic layer is isolated. The organic solution is then freed from its basic ingredients by extracting it with dilute acetic acid, the acetic extract is rendered alkaline, the oil which has separated is taken up in ether, the ethereal solution is dried with sodium sulfate and then evaporated. The crude product so obtained is then purified by distillation under reduced pressure. 2-phenyl-2-pyridyl-(4')-4-dimethylamino butyric ethyl ester is obtained in the form of a viscous red oil boiling at 153–158° C. under a pressure of 0.3 mm. of mercury.

With the aid of, for example, ethyl magnesium bromide, the ester so obtained may be transformed in known manner into the corresponding ketone.

We claim:

1. The process of preparing basic esters of the general formula:

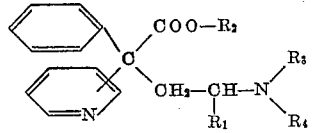

wherein $R_1$ represents a member of the group consisting of hydrogen and methyl, $R_2$ represents an alkyl radical having at most 4 carbon atoms and $R_3$ and $R_4$ represent alkyl radicals having at most 3 carbon atoms and taken together with —N< form a saturated heterocyclic ring system, which comprises reacting compounds of the general formula:

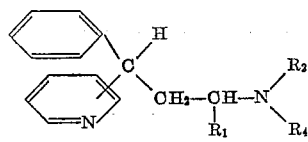

wherein $R_1$, $R_3$ and $R_4$ have the meanings given above, with a member selected from the group consisting of alkali metal amides, alkali metal hydrides and alkali metal compounds of hydrocarbons in the presence of an indifferent solvent, completing the reaction by heating, and then adding to the reaction mixture without isolation of the alkali metal compound formed, an ester of the group consisting of carbonic acid and chlorocarbonic acid, the alcohol components of which contain at most 3 carbon atoms.

2. The process as claimed in claim 1, wherein compounds of the general formula:

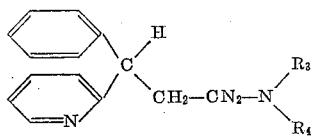

wherein $R_3$ and $R_4$ represent alkyl radicals having at most 3 carbon atoms, are used as starting material.

3. The process as claimed in claim 1, wherein compounds of the general formula:

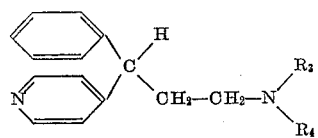

wherein $R_3$ and $R_4$ represent alkyl radicals having at most 3 carbon atoms, are used as starting material.

4. The process as claimed in claim 1, wherein the carbonic ester is the diethyl ester.

References Cited in the file of this patent

UNITED STATES PATENTS 2,676,964     Sperber et al.     Apr. 27, 1954

OTHER REFERENCES

Yost et al.: J. A. C. S., 1947, pp. 2325–28, vol. 69.
Morton et al.: J. A. C. S., 1949, pp. 481–86, vol. 71.